UNITED STATES PATENT OFFICE.

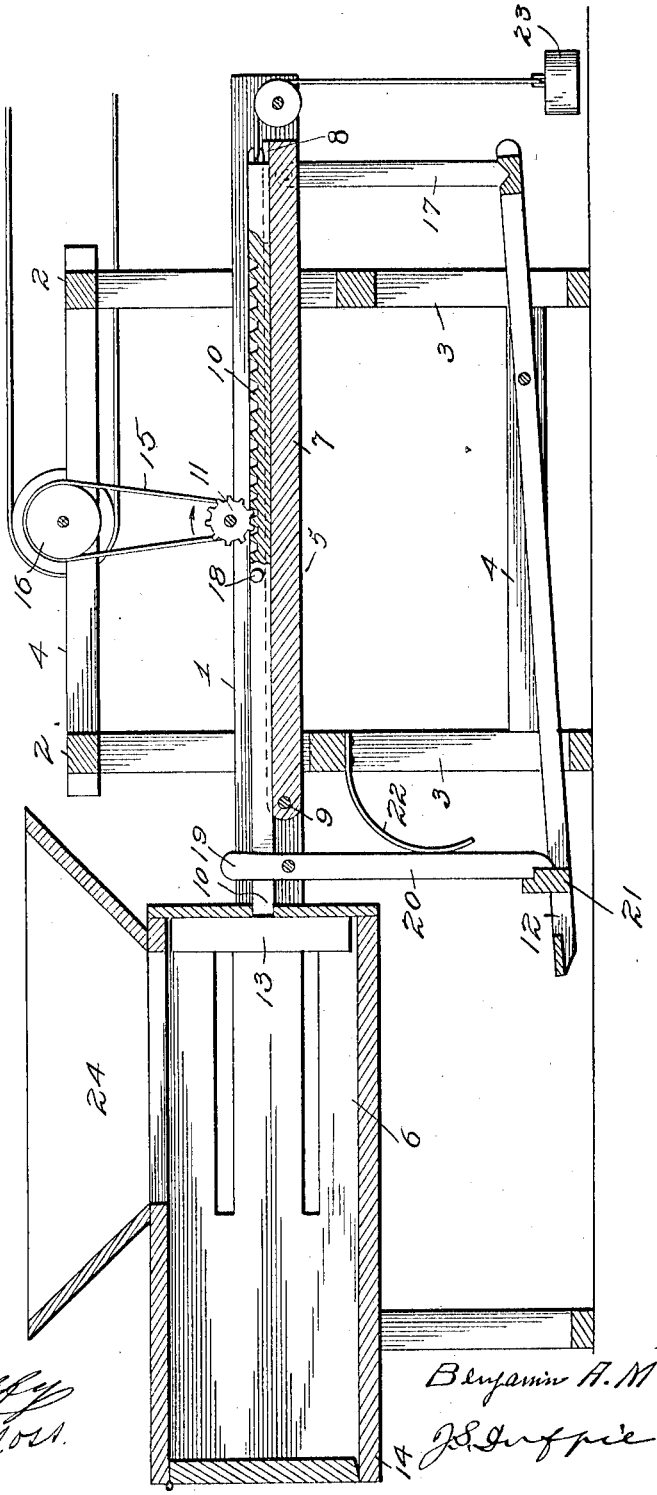

BENJAMINE A. McKINNEY, OF HARRISBURG, ARKANSAS.

HAY BALER AND PRESS.

1,055,204. Specification of Letters Patent. Patented Mar. 4, 1913.

Application filed August 5, 1912. Serial No. 713,355.

*To all whom it may concern:*

Be it known that I, BENJAMINE A. McKINNEY, a citizen of the United States, residing at Harrisburg, in the county of Poinsett and State of Arkansas, have invented certain new and useful Improvements in Hay Balers and Presses, of which the following is a specification.

My invention has relation to new and useful improvements in hay balers or pressers and the main object thereof is to construct a device of this nature that will enable the operator to bale the hay or other product with perfect safety and at the same time with great rapidity.

A further object of my invention is to produce a hay presser that will be simple in construction and easily operated and one which will not be liable to get out of order.

A further object of the invention is to produce a hay presser that will be comparatively cheap to manufacture and install.

It is pointed out that the operator can bale or press as much hay or other product, to be baled, as can be put into the hopper of the press.

With the foregoing and other objects in view my invention consists of the novel features of construction, combination and arrangement of the parts as are described in this specification, illustrated in the accompanying drawings forming a part thereof and particularly pointed out in the appended claims.

Referring to the drawing the figure is a vertical longitudinal sectional view of the press.

Referring more particularly to the drawing, in which like numerals designate like parts throughout, my invention is described as follows: The baler primarily consists of a frame 1, cross beams 2, vertical uprights 3 and longitudinal beams 4, said parts being properly secured together in any substantial manner adapted for the purpose. There is a trough 5 provided, which trough extends from the presser or hay receptacle 6 rearward, the bottom 7 of said trough being pivotally held to the side walls 8 thereof at its forward end at 9, said bottom supporting the rack bar 10 and adapting the latter to be thrown into and out of engagement with the sprocket 11 by the operation of a lever 12, as will be described hereinafter. To the forward end of the rack bar 10 is provided a head 13 which causes the hay received into the presser to be pressed toward the end 14 of the rectangular structure when the rack bar 10 is driven by the sprocket 11, which sprocket is in turn driven by the belt 15 traveling upon a pulley 16, power being transmitted to the latter from any suitable source, (not shown).

When it is desired to cause the rack bar 10 to travel toward the end 14 of the receptacle 6 the teeth of the rack bar are thrown into engagement with the teeth of the sprocket 11 by pressing the foot lever 12 downward which action forces the rear end of the trough bottom 7 upward by means of a vertical post 17 interposed between the rear ends of the lever and the bottom 7 of said trough. The teeth being thus engaged the power transmitted from pulley 16 will cause the head 13 to travel toward the end 14 and this action will continue until a pin 18 contacts the upper end 19 of the lever 20 which is held in engagement with the beam 21 secured to said lever 12 by means of a flat curved spring 22. This action releases the teeth 10 from engagement with the sprocket 11 and permits the rack bar 10 together with the head 13 to be drawn rearward by the weight 23. As soon as the head 13 is drawn into the position illustrated the hopper 24 is then ready to receive the additional supply of hay. When the foot lever 12 is again pressed downward it throws the rack bar 10 again into engagement with the sprocket 11 when the above described action reoccurs. Thus it will be seen that the hay can be pressed as fast as it is placed in the hopper 24 and the operator is enabled to stand in a position so that he will be entirely out of danger of accident of any sort.

Although I have specifically described the novel features of construction, combination and arrangement of the several parts of my invention yet I do not confine myself to the specific construction shown and described but reserve the right to make such changes therein as do not depart from the spirit of the invention or the scope of the appended claims.

Having described my invention what I claim as new, is:

1. In a device of the kind described, comprising a framework, a trough extending through the framework, the bottom of said trough pivoted in position at the forward end thereof, a rack bar slidably arranged upon the bottom of the trough, a box shaped structure held at one end of the framework, a head provided on the end of the rack-bar, said head being within the box shaped structure, a hopper leading into the box shaped structure to conduct the product to be pressed thereinto, means to cause the rack bar to travel forward and means to throw the last-named means automatically out of engagement with the rack bar and permit the rack bar to return to its normal position, substantially as shown and described.

2. In a device of the kind described, comprising a framework, a trough extending through the framework, the bottom of said trough pivoted in position to longitudinal beams of the framework at the forward end of the bottom, a box-shaped receptacle held at one end of the frame, said receptacle receiving the product to be pressed through a hopper provided therefor, a plunger slidably held on the end of the rack-bar, and within the receptacle, means comprising a gear wheel to transmit power to the rack bar, means to transmit motion to the gear wheel, and means to automatically throw the gear out of engagement with the rack bar, said means consisting of a pin held to the latter, a lever extending downward from one of the side walls of the trough, a foot lever held in lowered position by means of said lever, said pin adapted to contact the upper end of the first-named lever and disengage it from the foot lever and permit the rack bar to swing a sufficient distance on its pivot to become disengaged from said gear, substantially as shown and described.

In testimony whereof I affix my signature in presence of two witnesses.

BENJAMINE A. McKINNEY.

Witnesses:
   ROBT. E. HARE,
   CHARLES E. MOORE.